United States Patent [19]
Ellis

[11] 4,060,329
[45] Nov. 29, 1977

[54] METHOD AND APPARATUS FOR MEASURING DEFLECTION OF ROTATING AIRFOILS

[75] Inventor: Delmar H. Ellis, Cincinnati, Ohio

[73] Assignee: General Electric Company, Cincinnati, Ohio

[21] Appl. No.: 625,053

[22] Filed: Oct. 23, 1975

[51] Int. Cl.$^2$ .................... G01B 11/00; G01M 9/00
[52] U.S. Cl. ..................... 356/167; 73/655; 250/224
[58] Field of Search ............... 356/156, 167; 250/224; 73/71.3, 455, 457

[56] References Cited

U.S. PATENT DOCUMENTS

| | | | |
|---|---|---|---|
| 3,782,176 | 1/1974 | Jacobs | 73/71.3 |
| 3,908,444 | 9/1975 | Peter | 250/224 |

FOREIGN PATENT DOCUMENTS

| | | | |
|---|---|---|---|
| 353,732 | 5/1974 | United Kingdom | 73/71.3 |
| 236,827 | 6/1969 | U.S.S.R. | 73/71.3 |

OTHER PUBLICATIONS

Philbert et al., "Capteur Optique de Vibrations" Mesures Regulation Automatisme (France), Jan.–Feb. 75, pp. 45–54.
Zablotskiy et al., "Contactless Measuring of Vibrations in the Rotor Blades of Turbines", FTD-HT-23-6-73-74, 4-1974.
Zablotskiy et al., "Experimental Determination of Natural Forms of Vibration in Blade Rows When Flutter is Present in the Blades," FTD-HT-23-674-74, 3-1974.

*Primary Examiner*—John K. Corbin
*Assistant Examiner*—Wm. H. Punter
*Attorney, Agent, or Firm*—Robert C. Lampe, Jr.; Derek P. Lawrence

[57] ABSTRACT

A method and apparatus for measuring deflection of rotating members, such as the blades of a turbomachinery stage, are provided. The rotating member is illuminated with a high intensity light beam, such as a laser, at least one location upon the member where deflection is to be determined. Another location which serves as a reference is also illuminated in a similar manner. As the rotating member passes through the light beams, the light beams are reflected from reflective patches, thereby producing light impulses which are received by a light measuring device. The light pulses are converted to electrical impulses, the time increment between pulses being a function of the distance between the two locations and, thus, a measure of deflection. The dynamic component of blade-to-blade vibration is determined by comparing the time increments for a plurality of blades in the stage.

14 Claims, 8 Drawing Figures

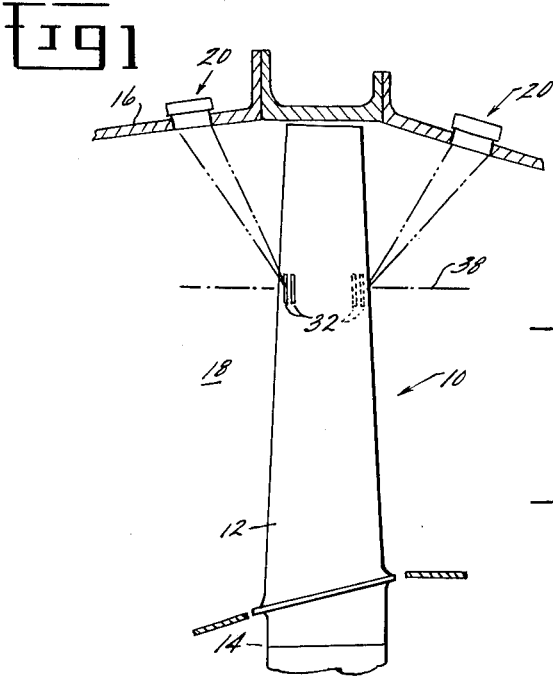
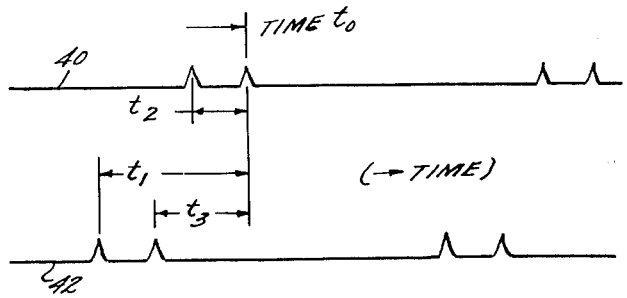
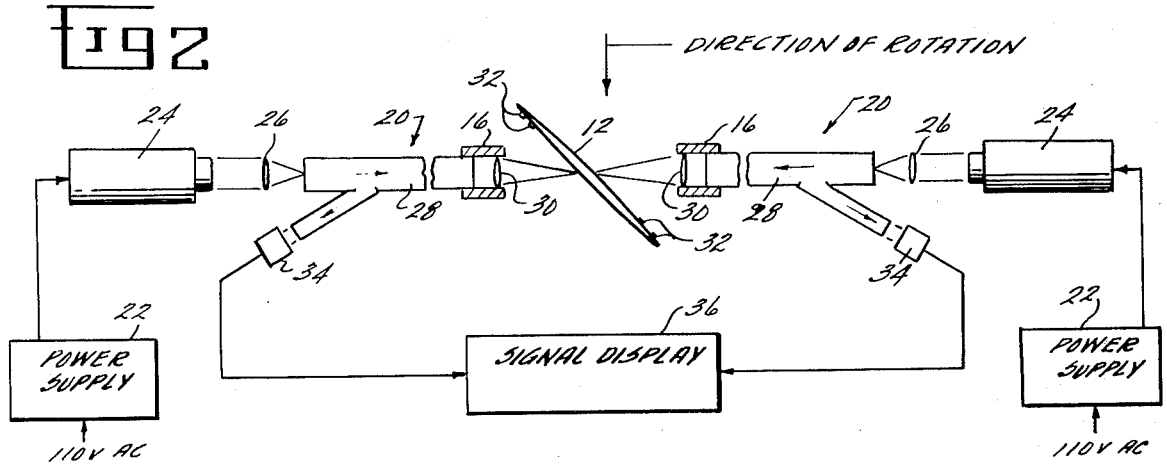
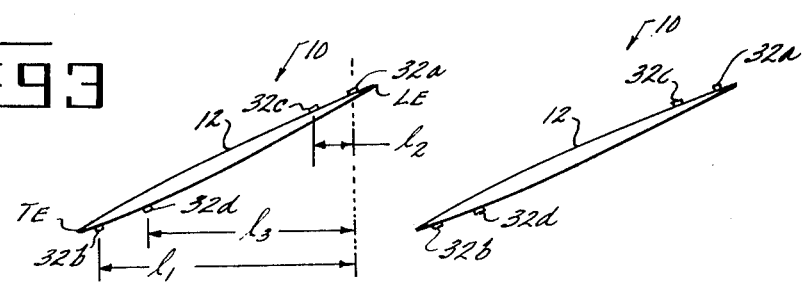

METHOD AND APPARATUS FOR MEASURING DEFLECTION OF ROTATING AIRFOILS

The invention herein described was made in the course of or under a contract, or a subcontract thereunder, with the United States Department of the Air Force.

BACKGROUND OF THE INVENTION

This invention relates to measurement techniques and, more particularly, to a technique for measuring airfoil deflections on rotating turbomachinery.

In the gas turbine industry, many rapidly advancing technologies are required to support the demands of commercial and military users. Major advances have been attained in recent years in performance, weight minimization, power output, and reliability, as well as the diversity of applications. Recently, aeromechanics, and specifically blade instability prevention, has been identified as a pacing technology, the current growth rate of which presents a restrictive limitation on gas turbine engine development.

One of the major regimes of blade instability which must be avoided is supersonic instability (or flutter), a regime about which blade instability technology has been least developed. This supersonic instability occurs at high Mach numbers representative of contemporary blade designs and is difficult to simulate in simple nonrotating blade cascade tests. Since supersonic instability is expected to present the greatest restrictions to future gas turbine engine fan and compressor development, analysis must progress on representative rotating hardware.

Supersonic instability results from blade dynamics and nonsteady aerodynamic forces which are blade motion dependent. These forces are so coupled that, just beyond the stability boundary, perturbations of blade motion produce net aerodynamic energy input to the blade with increasing amplitude (in the sense of a true feedback system) until nonlinear aerodynamic characteristics intervene to produce a limit cycle response. While considerable progress has been made in theoretically defining supersonic regime, nonsteady aerodynamic flow fields and the corresponding blade motion-dependent forces for nonseparated flow conditions, such theoretical, mathematical solutions are insufficient without precise experimental guidance and confirmation on representative rotating turbomachinery. Since blade instability involves blade dynamics (vibration and flutter)/non-steady aerodynamic interaction over the entire blade span (for which there are yet no transonic solutions), the entire span must be explored experimentally to completely understand and solve the instability problem.

While analysis and understanding of the unsteady dynamic response of blades to unsteady aerodynamic forces is essential to the advancement of gas turbine engine technology, the steady-state (or time averaged deformation of a blade over multiple blade cycles) is also important. Typically, turbomachinery blades are provided with radially variant camber, stagger and lean. Under the influence of centrifugal loading at high rotational speeds, the blades tend to untwist. Since the blade aerodynamic performance is directly related to the orientation of each blade radial section with respect to the motive fluid passing therethrough (incidence angle), such steady-state blade deflections can seriously alter component performance (and perhaps induce nonsteady blade instability as previously discussed). Accordingly, it has become common to factor into each rotating blade a predetermined, theoretically calculated amount of pretwist to compensate for the untwist (or unstagger) anticipated at a particular operating condition. Experimental verification of the anticipated untwist, as well as discovery of any other blade deformation under loading, is therefore necessary for performance optimization. Thus, experimental determination of both the steady-state and dynamic response of blades under actual operating conditions is required.

In the past, several measurement systems have been developed for disposition within a casing surrounding a rotating bladed turbomachinery stage to detect blade passing. One popular scheme incorporated magnetic detectors. Through the appropriate electronic circuitry, deflection of the blade tip was determinable. The limitation of some such systems was that they were necessarily limited to determining only the blade tip deflection in the steady-state mode. Others were limited in accuracy and vibratory deformation range. Clearly, a measurement technique is required to accurately determine the steady-state and dynamic response of rotating blades along their entire blade span.

SUMMARY OF THE INVENTION

Accordingly, it is the primary object of the present invention to provide improved apparatus for measuring the deflection of blades in rotating turbomachinery.

It is a further object of the present invention to provide an improved method for determining rotating blade deflections along the entire blade span.

These and other objects and advantages will be more clearly understood from the following detailed description, drawings and specific examples, all of which are intended to be typical of rather than in any way limiting to the scope of the present invention.

Briefly stated, the above objectives are accomplished, in one embodiment, by providing a light reflective patch upon the physical blade surface at each location for which deflections are in question. For example, a plurality of reflective spots or strips may be disposed chordwise at a particular spanwise location. A high-intensity light source, mounted on the static casing circumscribing the stage is focused at the appropriate radial plane upon each reflective patch, the focal points of the light sources being calibrated with respect to each other. As the blade rotates past its appropriate light source, a reflected light impulse is created and is sensed by a light measuring instrument, such as a photodiode, mounted near the light source, also within the static casing. The light impulse created when the reflective patch passes through the focused light beam is converted into an electronic signal which may be represented on any appropriate signal display, such as an oscilloscope in real time or recorded on tape for oscillograph data reduction. The time between light impulses from each patch on the blade can easily be converted to a length dimension, knowing the blade rotational speed. Deflections of the blade are simply the change in known positions and can be expressed as tangential relative deflections or as angular deflections. If a signal (impulse) from a location monitoring the passing of a rigid point on the rotating structure is used as a reference, then each blade point deflection can be independently expressed relative to the known rigid point. The steady-state deflections would merely be the time averaged deflection of multiple blade signals.

If each blade is appropriately instrumented with reflective patches, the dynamic content of blade-to-blade vibration can be determined. The time differential between reflective impulses at two locations upon each blade (or one blade location and a fixed reference) may be converted by means of a known ramp generator to produce an output signal (voltage) proportional to the time increment. When the output signals of consecutive blades are displayed, the blade-to-blade dynamic vibratory pattern is readily determinable. Such a system is capable of determining any nonstanding blade instability (i.e., any wave instability which rotates relative to the light source) such as supersonic blade flutter or rotating stall. Resonance or force vibrations due to, for example, struts in the vicinity of the rotating stage are not detectable since these wave patterns are generally stationary with respect to the casing and light sources.

In an alternative embodiment, small photocell transducers which convert light impulses to electric signals are mounted on the physical blade surface at the location for which deflections are in question. A focused light source, mounted on the static casing, is utilized to provide a light impulse as the corresponding photocell rotates past the focal point. The focal points of each light source are again calibrated in relation to each other. The electronic signals from the photo cells are transmitted by lead out wires through a slip ring to an oscilloscope or recorder.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

FIG. 1 diagrammatically depicts a gas turbine engine fan stage instrumented according to one embodiment of the present invention;

FIG. 2 is a schematic representation of the deflection measuring apparatus of the present invention;

FIG. 3 is a schematic view of a pair of blades showing the placement of reflective patches and characteristic lengths;

FIG. 4 represents typical oscilloscope time traces generated by the apparatus of FIG. 2;

DESCRIPTION OF THE PREFERRED EMBODIMENT

Figure 5:
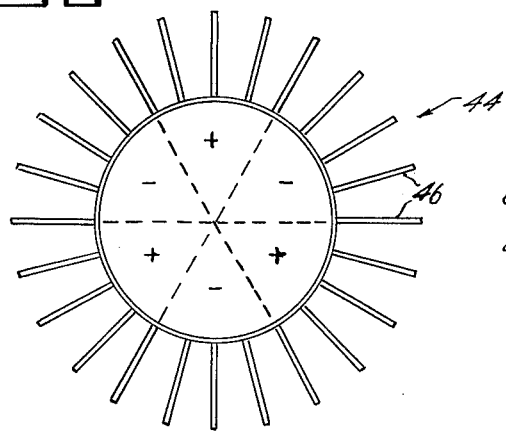
FIG. 5 shows a three-nodal diameter coupled blade-disc vibration mode.

Referring to the drawings wherein like numerals correspond to like elements throughout, attention is first directed to FIG. 1 wherein a gas turbine engine fan stage, depicted generally at 10, is diagrammatically shown in cross-sectional view. The stage comprises a plurality of blades 12, only one of which is shown for clarity, mounted upon a disc or spool 14 for rotation of an axis of symmetry (not shown). A rigid casing 16 circumscribes the blades to partially define a motive fluid flow path 18. A motive fluid, typically air, enters the rotating stage from the left of FIG. 1, is pressurized by the action of blades 12, and is discharged to the right.

Since all rotating blades are subject to static and dynamic deflections as a result of aerodynamic forces, it becomes desirable to measure such deflections in the rotating environment. Therefore, and in accordance with a major objective of the present invention, a blade deflection measuring apparatus is provided. Referring now to FIG. 2, such an apparatus, represented generally by module 20, is schematically shown. The module comprises a power supply 22 powering a high intensity light source 24 such as a laser. As will become readily apparent, the use of a high intensity light source permits blade deflections to be measured along the entire blade span. Preferably, the power supply and laser would be mounted external to the casing 16. The columnar light produced by the laser is focused through a lens 26 and thereafter transmitted through the casing 16 by means such as bundled, small diameter optical fibers 28. The light beam is then further focused through a lens 30 onto the appropriate location on a blade surface the deflection of which is to be measured.

In the case of the rotating fan stage 10, the blade physical surface is provided with a plurality of light reflecting and light dispersing patches 32 (FIG. 1) on a nonreflective background of the blade, at each location for which deflections are in question. As the blade 12 rotates past the stationary light source, a reflected light impulse is created, at least a portion of which is collected by lens 30 and transmitted through the optical fibers 28 to a light measuring instrument such as a photodiode 34, mounted proximate the light source, also preferably upon the static casing 16. The light impulse beam transmitted to the light measuring instrument is converted into an electronic signal which may be represented on any appropriate signal display, such as an oscilloscope 36 in real time or recorded on tape for later oscillograph data reduction. This signal is then converted into a measure of blade deflection in a manner soon to be described.

Referring now to FIG. 3, there is depicted therein a schematic view of a pair of blades 12 looking inward at any particular radial plane 38 (FIG. 1). Each blade is provided with at least two light reflective patches, 32a and 32b, proximate the leading and trailing edges of the blade, respectively, the blade patches being separated axially (chordwise) by a known distance $l_1$ in the static or no-load condition. The reflective patches are placed on a nonreflective background to enhance the reflected image. It has been found that glass beaded reflectors using an epoxy adhesive provides a satisfactory arrangement, though other types of reflectors might work equally well. The reflectors of FIG. 3 are depicted schematically and it is recognized that it is desirable that they be contoured to the blade physical surface to provide as little disruption of the airflow as possible.

Because the blades typically have camber and stagger, it may become impossible to illuminate the reflectors 32a, 32b at the leading and trailing edges, respectively, with a single light source mounted within the casing due to line-of-sight blockage by the adjacent blade. Thus, it becomes necessary to utilize a pair of modules 20 to illuminate the reflectors as indicated in FIG. 1, with reflector 32a being mounted on the suction surface of the blade and reflector 32b being mounted on the pressure surface. Both modules 20 would have their output signals channeled to the signal display device 36.

As the blade rotates past its appropriate light source module 20, the reflected light impulses are converted to electrical signals which may be displayed as a typical oscilloscope time trace depicted in FIG. 4. Trace 40 depicts, for example, the signal from the module forward of the blade leading edge while trace 42 depicts the signal from the aft module. From data of the time differential between time $t_0$ when reflector 32a passes through the circumferential light plane illuminated by its appropriate module 20 and time $t_1$ when reflector 32b is illuminated by its corresponding module, and the blade rotational speed at the particular radial plane 38 in question (determinable by any of several known means), the axial distance between reflectors 32a and 32b can be calculated. Since deflections of the blade are simply the changes in known positions, they can be expressed as tangential relative deflections or angular deflections.

To more particularly define the local chordwise bending, reflectors 32c and 32d (FIG. 3) may be provided in relatively close proximity to reflectors 32a and 32b, respectively. The time differentials between the passage of the pair of reflectors 32a, 32c ($t_2$), and between 32a and 32d ($t_3$) can be converted in a similar manner to characteristic lengths $l_2$ and $l_3$, respectively. This will not only define the magnitude of the chordwise bending, but will also provide the means to determine the slope of the blade mean camber line. Thus, total deformation of the camber line can be determined.

In a similar manner, if an impulse signal from a module location monitoring the passing of a rigid point on the rotating structure is used as a reference (as, for example, a point on the disc or spool 14) then each blade point of deflection can be independently expressed relative to the known rigid point and absolute deflections relative to the known point will be established.

Thus, the deflection of any blade as it passes the circumferential plane of the light modules can be determined. The choice of high intensity light as the source permits the designer to obtain reflections and impulses along the entire blade span providing, of course, that reflective material has been appropriately applied. A simple focusing mechanism attached to each module will provide the necessary flexibility. Accordingly, the deflection of the entire blade span can be explored.

Figure 6:
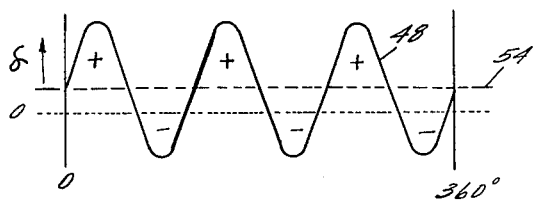
FIG. 6 graphically depicts the deflection of blades in the mode of FIG. 5.

Until now, the discussion has been directed primarily toward steady-state deflections of a blade utilizing the present inventive concepts. However, the dynamic content of blade-to-blade vibration can also be determined. Consider, for example, the bladed disc 44 represented schematically in FIG. 5 under the influence of an aerodynamic instability induced by supersonic shock interaction with the blades 46, or some undefined source of rotating stall. Consider further that the bladed disc is responding in a three-nodal diameter coupled blade-disc mode such that at any instant in time, and at any given radial plane, the locus of the deflections of the blades about the circumference may be represented by curve 48 as in FIG. 6 which is a graphical representation of deflection δ (measured from the blade neutral position δ = 0) as a function of circumferential location. If the wave pattern represented by FIG. 6 is not stationary with respect to the casing and the light modules, then the blade-to-blade dynamic variation may be determined in a manner now to be described.

Figure 7:
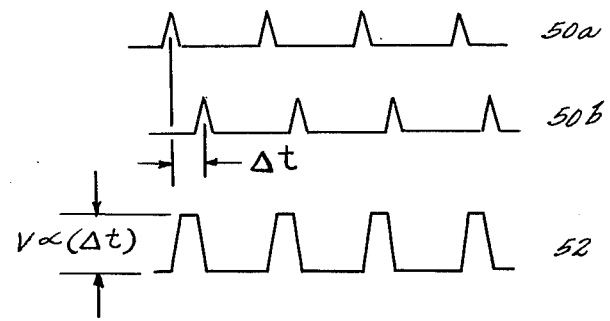
FIG. 7 is a representation, similar to FIG. 4, of further typical oscilloscope time traces.
Figure 8:
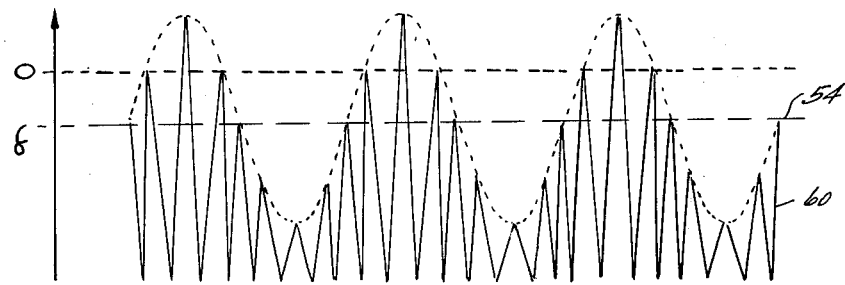
FIG. 8 is a representation of the dynamic content of blade-to-blade vibration for the vibratory mode of FIG. 5.

If each blade 46 in the disc is provided with the appropriate reflective patches 32 as shown in FIG. 3, then for each blade a pair of time signals, 50a and 50b, will be obtained for reflective patches 32a and 32b, respectively, as represented by the typical oscilloscope display of FIG. 7. By means of an electronic signal generator, the incremental time Δt, between impulses can be converted to a signal typified by curve 52 wherein the signal height represents a voltage (V) proportional to Δt. Each instrumented blade will produce a unique characteristic signal 52 dependent upon its degree of deformation. When all of these signals are displayed, the trace 60 of FIG. 8 representing the dynamic content of blade-to-blade vibration results, with each spike representing a distinct blade deflection.

The average steady-state deflection constitutes a time average of all the blade deflections over multiple blade passings and may be represented by dashed line 54. The deviation of each blade from the nominal steady-state value then represents the dynamic blade-to-blade deflections due to the unsteady forcing function.

It is clear that such a system cannot detect dynamic resonance since there would be no wave pattern which would move relative to the light modules. Only when the wave pattern rotates, as with rotating stall or supersonic flutter, can the dynamic pattern be identified.

It will be obvious to one skilled in the art that certain changes can be made to the above-described invention without departing from the broad inventive concepts thereof. For example, in an alternative embodiment, small photocell transducers which convert light impulses to electronic signals can be mounted on the physical blade surface at the locations for which deflections are in question. The high intensity focused light source, mounted on the static casing can be utilized to provide a light impulse as the corresponding photocell rotates past the focal point. The electronic signals from the photocells can be transmitted by leadout wire through a slip ring on the rotating structure to an oscilloscope or recorder, with the data reduction being treated in the same manner as previously described to obtain deflections. It is intended that the appended claims cover this and all other variations of the described invention's broader inventive concept.

Having thus described the invention, what is claimed as novel and desired to be secured by Letters Patent of the United States is:

1. A method of measuring deflection of a rotating member of finite radial length comprising the steps of:
   illuminating a portion of the radial length of the rotating member spaced from the tip thereof with a first high intensity light beam projected from a location axially disposed from said member, the illuminated portion being that at which deflection is to be determined;
   illuminating a rotating reference location with a second high intensity light beam;
   reflecting and dispersing the first and second high intensity light beams from their respective locations as light impulses;
   sensing at least a portion of the reflected light impulses with light sensitive means;
   converting the light beam impulses to electrical impulses;
   measuring the time increment between the electrical impulse related to the deflection measurement location and the electrical impulse related to the rotating reference location; and
   converting the time increment to a length dimension.

2. The method as recited in claim 1 wherein the rotating reference location is located upon the rotating member.

3. The method as recited in claim 1 wherein said first and second high intensity light beams comprise laser beams.

4. The method as recited in claim 1 wherein said reflected light impulses are sensed by photodiodes which convert the light impulses to electrical impulses.

5. The method as recited in claim 1 for measuring the dynamic component of blade-to-blade vibration in a rotating bladed turbomachinery stage comprising the steps of:

illuminating a plurality of rotating blades with a first high intensity light beam, each at a first location along the radial dimension of the blade spaced from the tip thereof at which deflection is to be determined;

illuminating said blades with a second high intensity light beam, each at a second location removed chordwise from said first location;

reflecting and dispersing the first and second light beams from their respective blade locations as light impulses;

sensing at least a portion of the reflected light impulses with a light sensitive means;

converting the light impulses to electrical impulses;

measuring the time increment between the electrical impulses related to the first and second blade locations for each blade; and comparing the time increments for each blade.

6. An apparatus for measuring the deflection of a rotating member of finite radial length comprising:

first illuminating means for illuminating the rotating member with a first high intensity light beam at one of a plurality of locations along its radial length spaced from the tip thereof at which deflection is to be determined;

second illuminating means for illuminating a rotating reference location with a second high intensity light beam;

means for reflecting and dispersing the first and second high intensity light beams from their respective locations as light impulses;

means for sensing at least a portion of the reflected light impulses;

means for converting the light impulses to electrical impulses; and means for measuring the time increment between the electrical impulse related to the deflection measurement location and the electrical impulse related to the rotating reference location.

7. The apparatus as recited in claim 6 wherein the rotating reference location is located upon the rotating member.

8. The apparatus as recited in claim 6 wherein said first and second illuminating means comprise lasers.

9. The apparatus as recited in claim 6 wherein said means for reflecting comprises glass beads affixed to the rotating member with an epoxy resin.

10. The apparatus as recited in claim 7 wherein said means for reflecting comprises a first pair of reflective patches for illumination by said first illuminating means and a second pair of reflective patches, axially removed from said first pair of reflective patches, for illumination by said second illuminating means.

11. The apparatus as recited in claim 7 further comprising means for focusing said first and second high intensity light beams and means for varying the locations to be illuminated by said first and second high intensity light beams.

12. A method of measuring deflection of a rotating member of finite radial length comprising the steps of:

illuminating a portion of the radial length of the rotating member spaced from the tip thereof with a high intensity light beam projected from a location axially disposed from said member, the illuminated portion being that at which deflection is to be determined;

illuminating a rotating reference location with the high intensity light beam;

reflecting and disersing the high intensity light beam from both locations as light impulses;

sensing at least a portion of the reflected light impulses with light sensitive means;

converting the light beam impulses to electrical impulses;

measuring the time increment between the electrical impulse related to the deflection measurement location and the electrical impulse related to the rotating reference location; and converting the time increment to a length dimension.

13. An apparatus for measuring the deflection of a rotating member of finite radial length comprising:

illuminating means for illuminating the rotating member with a first high intensity light beam at a location along its radial length spaced from the tip thereof at which deflection is to be determined, and for illuminating a rotating reference location;

means for reflecting and dispersing the high intensity light beam from both locations as light impulses;

means for sensing at least a portion of each of the reflected light impulses;

means for converting the light impulses to electrical impulses; and means for measuring the time increment between the electrical impulse related to the deflection measurement location and the electrical impulse related to the rotating reference location.

14. A method of measuring deflection of a rotating member of finite radial length comprising the steps of:

illuminating a first photocell transducer affixed along the radial length of the rotating member spaced from the tip thereof with a first high intensity light beam projected from a location axially disposed from said member, the first photocell transducer being placed at the location at which deflection is to be determined, and converting the light beam into an electrical impulse;

illuminating a second photocell transducer affixed to the rotating member as a rotating reference with a second high intensity light beam to generate a reference electrical impulse;

measuring the time increment between the electrical impulses related to the first transducer and the second transducer; and converting the time increment to a length dimension.

* * * * *